US009684110B2

(12) United States Patent (10) Patent No.: US 9,684,110 B2
Bungenstock (45) Date of Patent: Jun. 20, 2017

(54) LIGHTING DEVICE FOR VEHICLES

(71) Applicant: Hella KGaA Hueck & Co., Lippstadt (DE)

(72) Inventor: Carmen Bungenstock, Kleinenberg (DE)

(73) Assignee: Hella KGaA Hueck & Co., Lippstadt (DE)

( * ) Notice: Subject to any disclaimer, the term of this patent is extended or adjusted under 35 U.S.C. 154(b) by 69 days.

(21) Appl. No.: 14/627,018

(22) Filed: Feb. 20, 2015

(65) Prior Publication Data

US 2015/0241616 A1 Aug. 27, 2015

(30) Foreign Application Priority Data

Feb. 26, 2014 (DE) .................... 10 2014 102 496

(51) Int. Cl.
*G02B 6/00* (2006.01)
*F21V 8/00* (2006.01)
*F21S 8/10* (2006.01)

(52) U.S. Cl.
CPC ............ *G02B 6/0021* (2013.01); *F21S 48/00* (2013.01); *F21S 48/215* (2013.01);
(Continued)

(58) Field of Classification Search
CPC . G02B 6/0021; G02B 6/0055; F21S 48/1241; F21S 48/22; F21S 48/225;
(Continued)

(56) References Cited

U.S. PATENT DOCUMENTS

2003/0202241 A1  10/2003  Blumel
2008/0151577 A1*  6/2008  Li .................... G02B 6/0016
362/620
(Continued)

FOREIGN PATENT DOCUMENTS

DE  102006042860 A1  4/2007
DE  102010005806 A1  7/2011

OTHER PUBLICATIONS

Lighting Research Center, Inllumination Fundamental, Nov. 26, 2013.*

*Primary Examiner* — Andrew Coughlin
*Assistant Examiner* — Keith Delahoussaye
(74) *Attorney, Agent, or Firm* — Husch Blackwell LLP

(57) ABSTRACT

The present invention relates to a lighting device for vehicles. The lighting device has a flat optical waveguide containing two opposing flat sides, a light input surface for the entry of light, and a light output surface for emitting the entering light at a light output side of the flat waveguide. The light input surface has a central input section disposed in the main beam direction in front of the light source, and an outer input section adjacent thereto. The central input section and the outer input section are shaped such that a first sub-light bundle of the light striking the central input section strikes a central region of a sub-surface of the light output surface disposed in the main beam direction in front of the light input surface after being reflected at the flat sides. A second sub-light bundle of the light source, striking the outer input section, strikes an outer region of the same sub-surface, adjacent to the central region.

10 Claims, 3 Drawing Sheets

(52) U.S. Cl.
CPC ....... *F21S 48/2212* (2013.01); *F21S 48/2243* (2013.01); *F21S 48/2262* (2013.01); *F21S 48/2281* (2013.01); *F21S 48/24* (2013.01); *G02B 6/003* (2013.01); *G02B 6/0055* (2013.01)

(58) Field of Classification Search
CPC ...... F21S 48/2231; F21S 48/215; F21S 48/00; F21S 48/2212; F21S 48/2243; F21S 48/2262; F21S 48/2281; F21S 48/24
USPC ................. 362/511, 510, 498, 499, 610, 613
See application file for complete search history.

(56) References Cited

U.S. PATENT DOCUMENTS

2010/0046242 A1 2/2010 Lambert et al.
2012/0033441 A1* 2/2012 Sousek ................ F21S 48/215
362/555

* cited by examiner

LIGHTING DEVICE FOR VEHICLES

CROSS REFERENCE

This application claims priority to German Application No. 10 2014 102496.6, filed Feb. 26, 2014, which is hereby incorporated by reference.

FIELD OF TECHNOLOGY

A lighting device for vehicles, having an optical waveguide containing
- two opposing flat surfaces for total reflection of the light entering the flat waveguide,
- a light input surface for the entry of light on a light input side of the flat waveguide,
- a light output surface for emitting the entering light at a light output side of the flat waveguide, wherein the light output surface forms a narrow surface connecting the opposing flat surfaces,
- such that a light source is allocated to each the light input surface, and such that the light input surface has a non-planar form.

BACKGROUND

A lighting device for vehicles is known from DE 10 2008 048 765 A1, having a flat optical waveguide with opposing flat sides, as well as a plurality of light sources. The light sources are disposed on a light input side of the flat waveguide. The light sources are each allocated a planar light input surface at which the light emitted from the light source enters the flat waveguide. The entering light is subjected to total reflection on the opposing flat sides, and emitted at a light output side of the flat waveguide toward a light output surface designed as a narrow side. The light enters the flat waveguide, undirected, via the planar light input surface, such that brightness differences occur at the narrow light output surface. In particular in the main beam direction in front of the light source in the region of an optical axis thereof, relatively high brightness values are obtained, leading to a non-homogenous illumination of the light output surface.

A generic lighting device for vehicles, having a flat waveguide and a plurality of light sources is known from DE 10 2007 057 399 A1, in which the reflective light input surfaces allocated to the light sources are spherical, i.e. not planar. As a result, a punctiform bright illumination of a light output surface can be softened in the main beam direction directly in front of the light source. The photometric efficiency, however, is compromised, because light diffusion occurs due to the frequent total reflection of the input light at the opposing flat sides, which is then lost to the required light distribution of the lighting device.

SUMMARY OF THE INVENTION

The object of the present invention is thus to further develop a lighting device for vehicles having a flat optical waveguide, such that a homogenous illumination at a light output surface of the flat waveguide is obtained in a cost-effective and simple manner, wherein the highest possible photometric efficiency is obtained.

In order to achieve this object, the invention may include a light input surface which has a central input section disposed in the main beam direction in front of the light source, and an outer input section adjacent thereto, wherein the central input section and the outer input section are shaped such that a first sub-light bundle from the light source striking the central input section strikes a central region of a sub-surface of the light output surface disposed in a main beam direction in front of the light input surface, and such that a second sub-light bundle from the light source striking the outer input section strikes an outer region of the same sub-surface, adjacent to the central region.

According to the invention, a light input surface of the lighting device has, on one hand, a central input section and, on the other hand, an outer input section. The central input section is shaped such that a first sub-light bundle from a light source striking it is directed into a central region of a sub-surface of the light output surface disposed in a main beam direction in front of the light input surface. The outer input section is shaped such that a second sub-light bundle from the light source striking it strikes an outer region thereof, adjacent to the central region of the sub-surface. The light from the light source entering the light input surface thus experiences a bundling and controlled light guidance toward the light output surface, which leads to a high photometric efficiency. The sub-surface of the light output surface, disposed in the main beam direction in front of the light input surface, is homogenously, or evenly, illuminated. The central input section shapes the first sub-light bundle from the light source, emitted at a relatively small angle of beam spread, and the outer input section shapes, or guides, the second sub-light bundle from the light source, emitted at a relatively large angle of beam spread. The central input section and/or the outer input section can be formed as a free-form surface.

According to a preferred embodiment of the invention, the central region and the outer region of the sub-surface extend over the respective light input surfaces allocated thereto, behind them in the main beam direction. The sub-surfaces are bordered by edges of the light output surface, which run to the adjacent flat sides of the light output surface. On the other hand, the central region, from which the first sub-light bundle is emitted, is separated from the outer region, from which the second sub-light bundle is emitted, by means of a transition section or by means of a borderline. The transition section and the borderline run substantially transverse to the extension of the flat sides. If there is a transition section, the central and outer input sections of the light input surface are designed such that a smooth transition between the central and outer region on the light output surface occurs. Thus, light beams from the first and second sub-light bundles are emitted in this transition section. If there is a borderline, the central and/or outer input section are shaped such that the central region is discretely separated from the outer region, without forming light output-side regions in which light beams from the first sub-light bundle and the second sub-light bundle are emitted. With both a transition section as well as a discrete borderline, a homogenous illumination of the light output surface is obtained along said light output surface. Appropriate transition sections or borderlines are, accordingly, also provided between adjacent sub-surfaces of the light output surface, which are allocated to corresponding discrete light sources at the back in the main beam direction.

According to a preferred embodiment of the invention, the central input section of the light input surface is shaped such that the first sub-light bundle is expanded in the direction of extension of the flat waveguide, and/or in the direction of extension of the light output surface, such that the central region of the sub-surfaces is designed such that it is elongated in the direction of extension of the light output surface. This is enabled by a different orientation of light beams from the first sub-light bundle in a plane perpendicular to the flat sides and in a plane in the direction of the flat sides. Advantageously, it is possible by this means for the light output surface to form central regions of the sub-surface that follow a contour, e.g. rectangular, at which the first sub-light bundle is emitted. The light beams from the first sub-light bundle can have a larger angle of beam spread, for example, in the direction of the flat sides, than in the direction perpendicular to the flat sides. The illuminations of the light output surfaces can thus be adapted to the elongated geometries of the light output surfaces. If the first sub-light bundle is expanded in a direction perpendicular to the direction of extension of the light output surface, then an adaptation to different thicknesses of the flat waveguide can be carried out.

According to a preferred embodiment of the invention, the outer input section is shaped such that the second sub-light bundle is bundled in a plane running perpendicular to the flat sides and to the light output side. Advantageously, as a result, the number of total reflections at the flat sides can be reduced, which decreases the diffusion losses.

According to a further development of the invention, the outer input section is disposed on both sides of the central input section. Furthermore, a collecting section extends on a side of the outer input section facing away from the central input section, at which light beams from the second sub-light bundle are subjected to total reflection toward the outer region of the sub-light surface. Advantageously, as a result it is possible for the light beams of the second sub-light bundle not to be subjected to total reflection at the flat sides, further decreasing the diffusion losses. By means of the central input section it is ensured that the light beams of the first sub-light bundle are not subjected to total reflection at the flat sides of the flat waveguide, but instead, are guided directly toward the light output surface.

According to a further development, it is possible, in particular by means of a parabolic design of the collecting section, for the light beams of the second sub-light bundle to be further guided, parallelized, toward the light output surface. Alternatively, by means of the design of the collecting section and/or the outer input section, the second sub-light bundle can be diffused at a diffusion angle in relation to a plane running perpendicular to the flat sides and the light output surface, wherein border beams of the second sub-light bundle strike the edges of the light output surface. In this manner, no total reflection occurs at the flat sides either, such that the diffusion losses are low, or, respectively, a homogenous illumination is obtained at the outer region of the sub-surface.

According to a further development of the invention, the light output surface has a plurality of diffusion lenses, by means of which the first and second sub-light bundles are emitted at a predefined spatial angular range in order to generate a light distribution.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
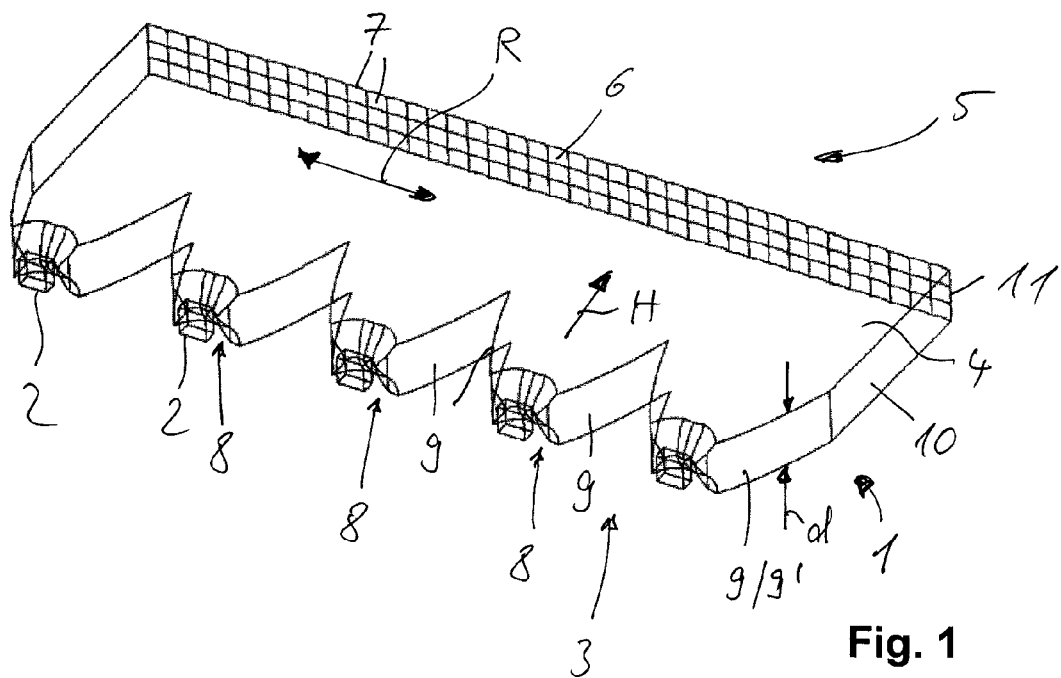
FIG. 1 is a perspective back view of a lighting device, viewed at an angle from above.
Figure 2:
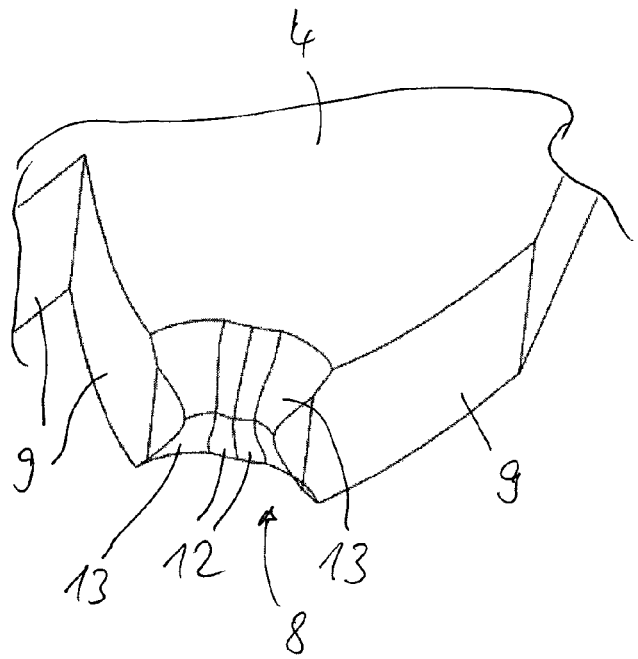
FIG. 2 is an enlarged perspective depiction of a light input surface of a flat waveguide in the lighting device.

An inventive lighting device for vehicles can be placed in the front or rear region of the vehicle, in order to generate a tail lamp, a brake light, or a daytime running light function.

The lighting device substantially consists of a flat waveguide 1 and a plurality of light sources 2, which are disposed on a light input side 3 of the flat waveguide 1. The light sources 2 are designed as semiconductor-based light sources, preferably as LED light sources.

The flat waveguide 1 has opposing flat sides 4, which are planar in the present embodiment example. The flat sides 4 border at the front, in the main beam direction, on a light output side 5 of a light output surface 6, at which a first sub-light bundle L1 and a second sub-light bundle L2, emitted, respectively, from the light sources 2, are emitted with a homogenous illumination of the light output surface 6, corresponding to a predefined light distribution. For emitting the sub-light bundles L1, L2 in a spatial angular range for generating a predefined light distribution, the light output surface 5 has a plurality of diffusion lenses 7, which preferably have a design in the shape of a pillow.

The flat waveguide 1 has a plurality of light input surfaces 8 on the light input side 3, disposed at a spacing to one another in the extension direction R thereof, to which a parabolic collecting section 9 adjoins on both sides. The collecting section 9 is designed as a notch on the light input side 3 of the flat waveguide 1. The collecting section 9 has the same thickness d as the lateral narrow sides 10 of the flat waveguide 1, which connect an outer collecting section 9' to a lateral edge 11, between which the light output surface 8 runs.

The light input surface 8 is non-planar. A light source 2 is allocated to each light input surface 8, wherein the light input surface 8 is disposed in front of the corresponding light source 2 in the main beam direction H.

The light input surface 8 has, on one hand, a central input section 12 and, on the other hand, outer input sections 13 adjoining the central input section 12 on both sides.

The first sub-light bundle L1 from the respective light sources 2 allocated to the light input surface 8 enters the flat waveguide 1 through the central input section 12, and the second sub-light bundle L2 from the respective light sources 2 allocated to the light input surface 8 enters the flat guide 1 through the outer input section 13. The central input section 12 and the outer input section 13 are shaped such that a bundling of the sub-light bundles L1, L2 occurs.

Figure 3:
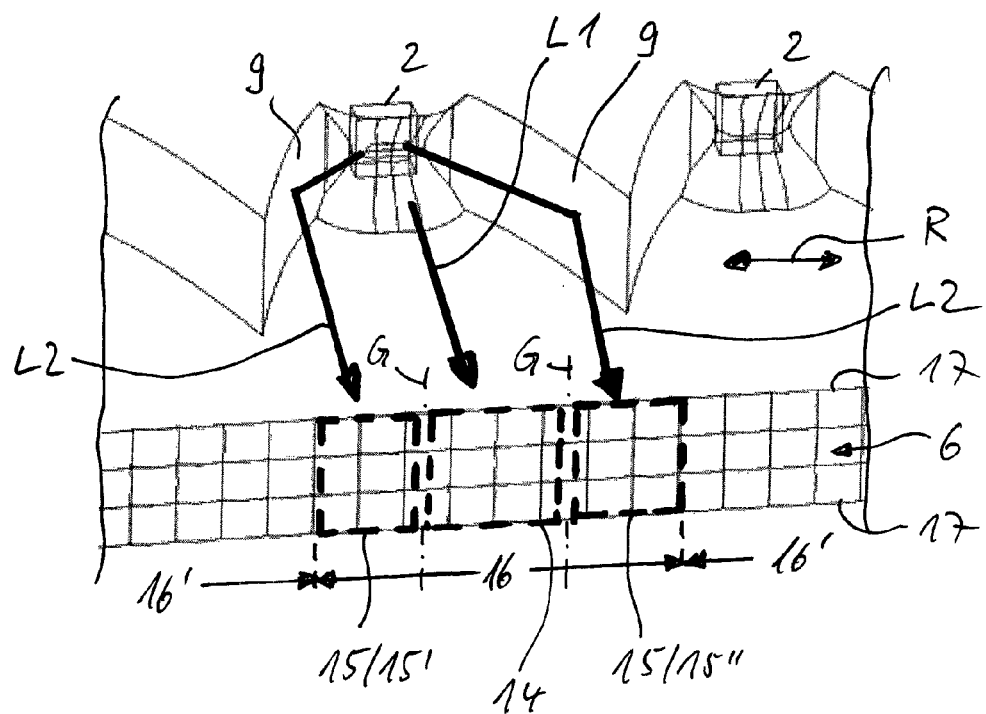
FIG. 3 is a perspective front view of the lighting device, with regions of the light output surface indicated, which emit sub-light bundles shaped by either a central input section or an outer input section of the light input surface.

As can be seen in particular from FIG. 3, the first sub-light bundle L1 is guided by means of the central input section 12 such that it strikes a central region 14 of a sub-surface 16 of the light output surface 6 disposed in the main beam direction in front of the light input surface 8, in the main beam direction H in front of the light input surface 8. The central input section 12 is shaped such that light beams from the first sub-light bundle L1 are oriented in different directions. By this means, the first sub-light bundle L1 can have an angle of beam spread in the extension direction R of the light output surface 6 that is greater than an angle of beam spread in a plane E, which runs at a right angle to the flat sides 4 and at a right angle to the light output surface 6. In this manner, the central region 14 of the sub-surface 16 extends in the extension direction R of the light output surface 6, and/or is rectangular.

Light beams of the first sub-light bundle L1 are broken at the central input section 12, such that they strike the light output surface 6 directly, without the occurrence of a total reflection of the light beams at the opposing planar flat sides 4 of the flat waveguide 1.

The second sub-light bundle L2 entering via the outer input section 13 strikes an outer region 15 of the sub-surface 16, which directly adjoins the central region 14 thereof.

The second sub-light bundle L2 entering at the outer input section 13 is subjected to total reflection at the collecting section 9, 9', this being toward the outer regions 15 of the sub-surface 16, while no further total reflection thereof occurs at the flat sides 4.

Figure 5:
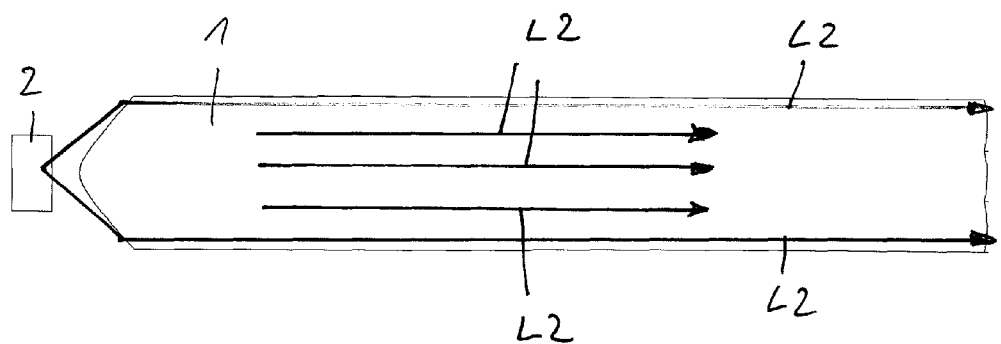
FIG. 5 is a view of the lighting device from a lateral narrow side, with parallel light beams indicated.

Because the collecting section 9, 9' is parabolic, the light beams of the second sub-light bundle L2 are subjected to a total reflection such that they run parallel to the planar flat sides 4 toward the outer regions 15, see FIG. 5. As can be seen from FIG. 3, a collecting section 9 reflects the second sub-light bundle L2 toward a first outer region 15' and another, opposing collecting section 9, allocated to the same light input surface 8, reflects the second sub-light bundle L2 toward a second outer region 15" of the sub-surface 16. There is thus no overlapping of the respective sub-light bundles L1, L2 inside the flat waveguide 1.

Figure 4:
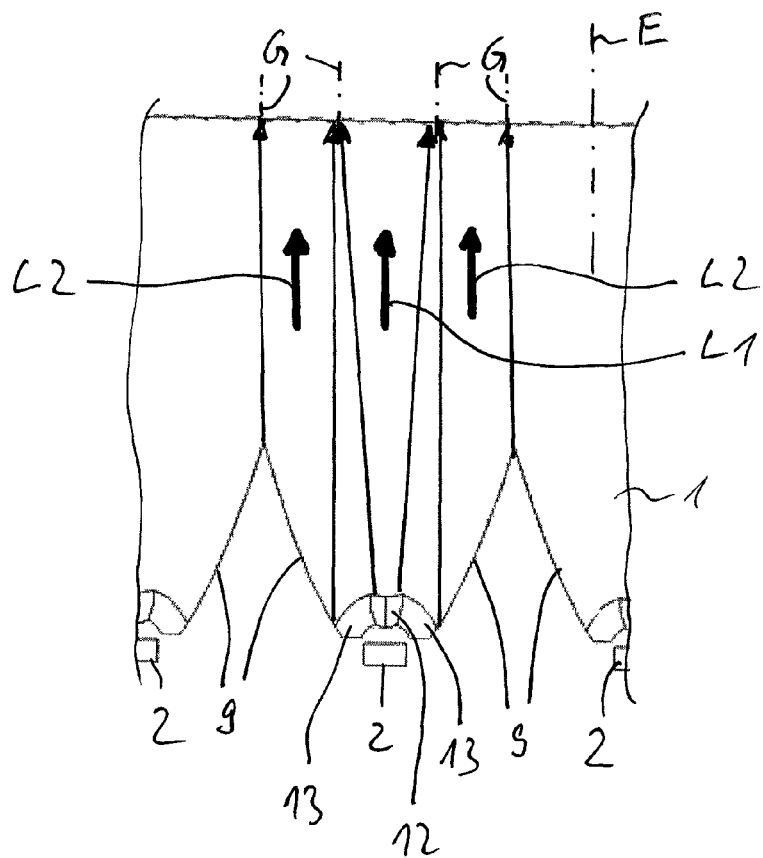
FIG. 4 is a section cut through the flat waveguide in its plane of extension, with light beams indicated.

As can be seen from FIGS. 3 and 4, the central region 14 is disposed such that it is separated from the adjacent outer regions 15, 15', 15" of the same sub-surface 16 by a borderline G. The first sub-light bundle L1 strikes only the central region 14 of the sub-surface 16. The second sub-light bundle L2 strikes only the outer region 15, 15', 15" of the same sub-surface 16. Thus, a discrete transition of the sub-light bundles L1, L2, shaped differently by means of a light input surface 8, occurs at the borderline G. There are brightness differences at the transition from the central region 14 to the outer region 15', or 15", respectively, such that the sub-surface 16 of the light output surface 6, allocated to the light source 2, is illuminated in a homogenous manner. The same applies to the transition from the sub-surface 16 to an adjacent sub-surface 16', which is allocated to another, preferably adjacent, light input surface 8.

As can be seen from FIG. 3, the central region 14 and the outer region 15, 15', 15" are bordered by edges 17 running in the extension direction R of the light output surface 6 and the borderline G, or sub-surfaces 16' adjacent to the border lines G, respectively. This transition is not visible, because the central region 14 and the outer regions 15', 15" each exhibit the same brightness values over their surfaces.

As can be seen from FIG. 5, the light beams of the second sub-light bundle L2 are parallel between the light input surface 8 and the light output surface 6 of the flat waveguide 1. This is caused, in particular, by the parabolic design of the collecting section 9, 9'.

Figure 6:
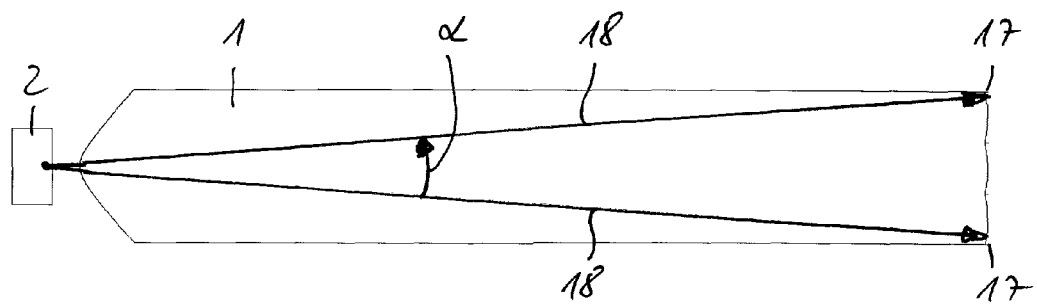
FIG. 6 is a view of an alternative lighting device, from a lateral narrow side, with diffused light beams indicated.

According to an alternative embodiment of the invention in accordance with FIG. 6, the outer input section 13 and/or the collecting section 9 can be shaped such that the second sub-light bundle L2 is diffused in the plane E at a diffusion angle α, this being such that border beams 18 of the second sub-light bundle L2 strike an edge 17 of the sub-surface 16, or the light output surface 6, respectively. There is likewise no total reflection of the second sub-light bundle L2 at the flat sides 4 with this embodiment. Advantageously, a homogenized illumination of the light output surface can be obtained, depending on the thickness d of the waveguide 1 at the light output side 5. In particular with relatively thick waveguides, the region of the light output surface 6 in the proximity of the edges 17 can thus also exhibit the same brightness values as the central region of the light output surface 6. As a result, an adaptation to different thicknesses d of the flat waveguide 1 is thus ensured. According to an embodiment of the invention that is not shown, instead of discrete borderlines G between the central region 14 and the adjacent outer regions 15', 15", a transition section can be provided, which is illuminated by the light beams from the first sub-light bundle L1 and the second sub-light bundle L2. In this manner, instead of an abrupt transition, a continuous transition of the sub-light bundles L1, L2 is created between the central region 14 and the adjacent outer regions 15. The same brightness as that in the central region 14 and the outer region 15', 15", in which light beams from only the first sub-light bundle L1, or only the second sub-light bundle L2, respectively, contribute to the illumination, is generated in the transition section by means of overlapping light beams from the first sub-light bundle L1 and the second sub-light bundle L2.

The thickness d of the flat waveguide 1 can lie in a range of 5 mm to 20 mm. The flat waveguide 1 is preferably made of a transparent plastic, by means of injection molding. The light input surface 6 is integrally connected to the flat waveguide 1.

LIST OF REFERENCE SYMBOLS

1 optical waveguide
2 light sources
3 light input side
4 flat sides
5 light output side
6 light output surface
7 diffusing lenses
8 light input surfaces
9, 9' collecting section
10 narrow sides
11 lateral edge
12 input section
13 outer input sections
14 central region
15, 15', 15" outer region
16, 16' sub-surface
17 edges
18 border beams
H main beam direction
R extension direction
L1 first sub-light bundle
L2 second sub-light bundle
d thickness
α diffusion angle
E plane
G borderline

The invention claimed is:

1. A lighting device for vehicles, having a flat waveguide, said flat waveguide comprising:
two opposing flat surfaces for total reflection of the light entering the flat waveguide,
at least one light input surface for the entry of light on a light input side of the flat waveguide, a light output surface for emitting the entering light at a light output side of the flat waveguide, wherein the light output surface forms a surface connecting the opposing flat surfaces, wherein a light source is allocated to each of the at least one light input surfaces, and such that each of the at least one light input surfaces has a non-planar form, wherein each of the at least one light input surfaces has a central input section disposed in a main beam direction in front of the light source, and an outer input section adjacent to the central input section, wherein the outer input section includes a concave portion in a first axis and a convex portion in a second axis normal to the first axis, wherein the central input section and the outer input section are shaped such that a first sub-light bundle of the light source striking the central input section strikes a central region of a sub-surface of the light output surface disposed in a main beam direction in front of each of the at least one light input surfaces, and in that a second sub-light bundle of the light source striking the outer input section strikes an outer region of the same sub-surface adjacent to the central region.

2. The lighting device according to claim 1, wherein the central region and the outer region of the sub-surface of each of the at least one light output surfaces are bordered by edges and a transition section is provided between the central region and the outer region of the sub-surfaces, which is illuminated by light beams from the first sub-light bundle and the second sub-light bundle, or the central region and the outer region of the sub-surfaces are separated from one another by a border line, wherein only the first sub-light bundle is emitted onto the one side, and only the second sub-light bundle is emitted onto the other side.

3. The lighting device according to claim 1 wherein exclusively light beams from the first sub-light bundle are emitted from the central region of the sub-surface, and exclusively light beams from the second sub-light bundle can be emitted from the outer region of the sub-surface.

4. The lighting device according to claim 1 wherein the central input section is shaped such that the first sub-light bundle is expanded in at least one of the direction of extension for the flat waveguide and in the direction of extension for the light output surface, such that the central region of the sub-surface is designed such that the sub-surface extends in at least one of the extension direction of the light output surface and that the first sub-light bundle is expanded in the direction of a plane illuminating perpendicular to the flat surfaces and to the light output surface, such that the central region of the sub-surface is designed such that the sub-surface extends perpendicular to the extension direction of the light output surface.

5. The lighting device according to claim 1 wherein the outer input section is designed such that the second sub-light bundle is bundled in a plane illuminating perpendicular to the flat surfaces and to the light output surface.

6. The lighting device according to claim 1 wherein the outer input section adjoins both sides of the central input section, and in that a collecting section cut into the flat waveguide adjoins one of the sides of the outer input section facing away from the central input section, at which light beams from the second sub-light bundle are subjected to total reflection toward the outer region of the sub-surface.

7. The lighting device according to claim 1 wherein at least one of the outer input section and the collecting section are shaped such that the second sub-light bundle is guided directly to the outer region of the sub-surface, without a total reflection of light beams from the second sub-light bundle occurring at the flat sides, and in that the central input section is shaped such that the first sub-light bundle is guided directly to the central region of the sub-surface, without a total reflection of light beams from the first sub-light bundle occurring at the flat surfaces.

8. The lighting device according to claim 7, wherein the second sub-light bundle illuminates in a diffused manner, parallel to flat surfaces or at a diffusion angle illuminating in a plane that is perpendicular to the flat surfaces, such that border beams of the second sub-light bundle strike the edges of the light output surface.

9. The lighting device according to claim 1 wherein at least one of the central region and the outer region of the sub-surface are designed in the shape of a rectangle or a square.

10. The lighting device according to claim 1 wherein the light output surface has numerous diffusion lenses for guiding the first sub-light bundle and the second sub-light bundle in a spatial angle range in order to generate a predefined light distribution.

* * * * *